United States Patent
Tagawa

(10) Patent No.: US 7,436,440 B2
(45) Date of Patent: Oct. 14, 2008

(54) IMAGE PROCESSING APPARATUS AND METHOD FOR DESCRIBING RECORDED ATTRIBUTE INFORMATION USING TAGS, AND PROGRAM FOR IMPLEMENTING THE METHOD

(75) Inventor: Yojiro Tagawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1059 days.

(21) Appl. No.: 10/658,292

(22) Filed: Sep. 10, 2003

(65) Prior Publication Data
US 2005/0073594 A1 Apr. 7, 2005

(30) Foreign Application Priority Data
Sep. 24, 2002 (JP) .............................. 2002-277244

(51) Int. Cl.
*H04N 5/76* (2006.01)
*H04N 7/173* (2006.01)
(52) U.S. Cl. .................. 348/231.2; 348/231.9; 725/105
(58) Field of Classification Search .............. 348/231.2, 348/231.9; 707/1–10; 725/105
See application file for complete search history.

(56) References Cited

U.S. PATENT DOCUMENTS

| | | | | |
|---|---|---|---|---|
| 6,947,954 B2 * | 9/2005 | Cohen et al. | ............. | 707/104.1 |
| 7,010,144 B1 * | 3/2006 | Davis et al. | ............. | 382/100 |
| 7,046,285 B2 | 5/2006 | Miyagi et al. | ........... | 348/333.05 |
| 7,308,508 B1 | 12/2007 | Dewa | ........................... | 709/247 |
| 2002/0113757 A1 * | 8/2002 | Hoisko | ............................ | 345/8 |
| 2003/0005464 A1 * | 1/2003 | Gropper et al. | .............. | 725/115 |
| 2003/0154178 A1 * | 8/2003 | McIntyre et al. | ............... | 707/1 |

FOREIGN PATENT DOCUMENTS

| | | |
|---|---|---|
| JP | 2000-261756 | 9/2000 |
| JP | 2001-28585 | 1/2001 |
| JP | 2001-189905 | 7/2001 |

* cited by examiner

*Primary Examiner*—Lin Ye
*Assistant Examiner*—Hung H Lam
(74) *Attorney, Agent, or Firm*—Fitzpatrick, Cella, Harper & Scinto

(57) ABSTRACT

An image processing apparatus, an image processing method, and a program for implementing the image processing method have a capability of recording/playing back a digital image, and the capability can be extended without a significant increase in load imposed on software. On the basis of camera information and picture-taking information, a XML generator produces a XML file to be written in a maker note area. The XML file is input to a maker note generator to produce maker note data including maker note IFD tags. The maker note is input together with the picture-taking information and the camera information to an Exif IFD generator to produce Exif IFD data. Finally, the Exif IFD data and compressed image data are input to an Exif generator to produce a Exif file. In this manner, the Exif file including the maker note area in which image attribute information is described in the XML language is produced.

3 Claims, 13 Drawing Sheets

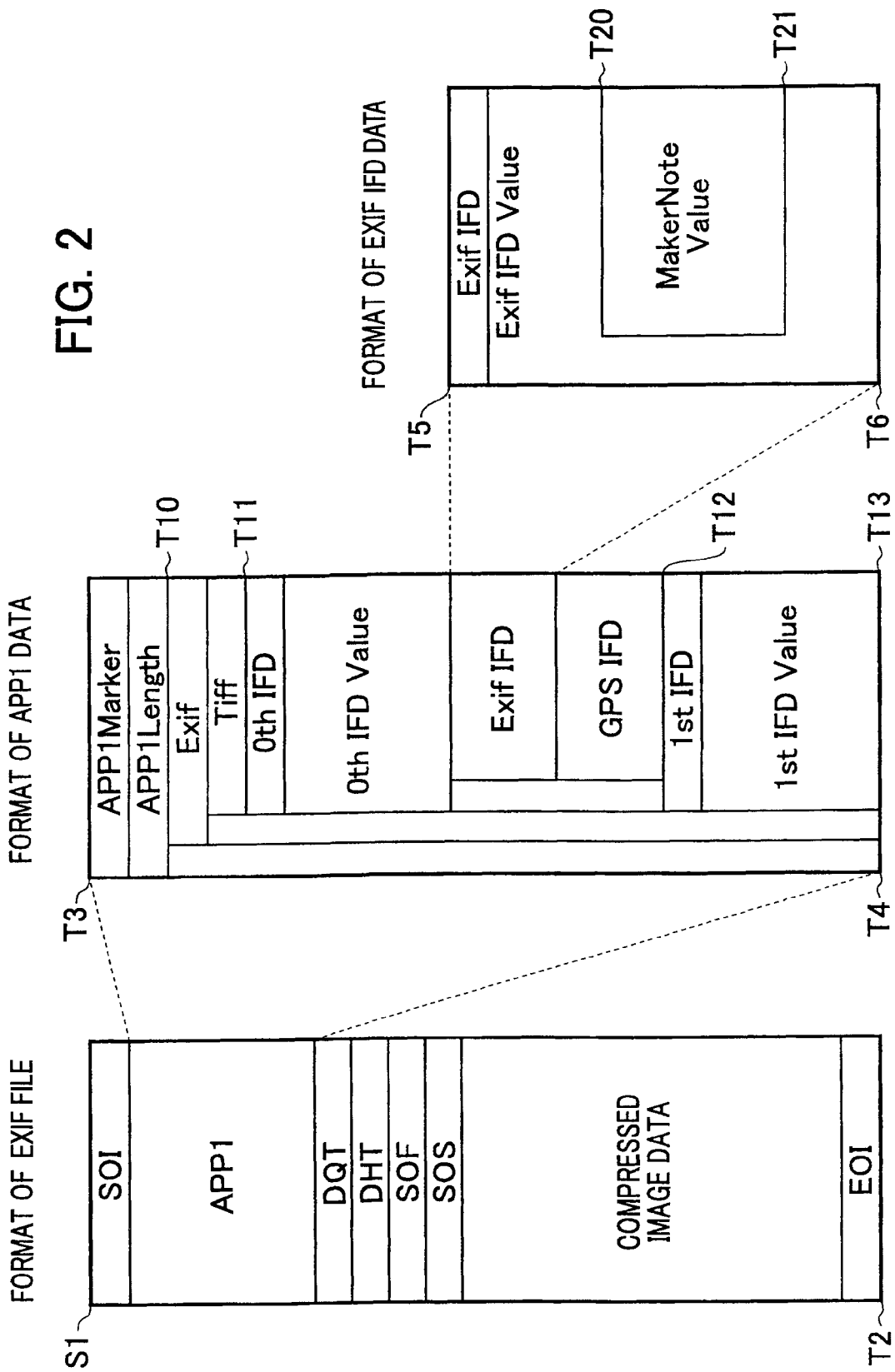

FIG. 3

| | Marker Name | Marker Code | DESCRIPTION |
|---|---|---|---|
| SOI | Start of Image | FFD8.H | START OF COMPRESSED DATA |
| APP1 | Application Segment 1 | FFE1.H | ADDITIONAL INFORMATION OF EXIF |
| APP2 | Application Segment 2 | FFE2.H | EXTENDED DATA OF EXIF |
| DQT | Define Quantization Table | FFDB.H | QUANTIZATION TABLE |
| DHT | Define Huffman Table | FFC4.H | HUFFMAN TABLE |
| DRI | Define Restart Interval | FFDD.H | RESTART INTERVAL |
| SOF | Start of Frame | FFC0.H | FRAME PARAMETERS |
| SOS | Start of Scan | FFDA.H | COMPONENT PARAMETERS |
| EOI | End of Image | FFD9.H | END OF COMPRESSED DATA |

FIG. 6

```xml
<?xml version="1.0" encoding="Shift_JIS"?>
<MakerNote>
        <CANON Version="0.00.00">
                <UserSetting>
                        <Macro>On</Macro>
                        <SelfTimer>On</SelfTimer>
                        <CompQuality>Fine</CompQuality>
                        <EF>Auto</EF>
                        <ReleaseMethod>Single</ReleaseMethod>
                        <ShootingNumber>0</ShootingNumber>
                        <ReleaseTiming>FocusPriority</ReleaseTiming>
                        <ImageSize>Large</ImageSize>
                        <ImageMode>Auto</ImageMode>
                        <Contrast>default</Contrast>
                        <ColorGain>default</ColorGain>
                        <Sharpness>default</Sharpness>
                        <Sensitivity>default</Sensitivity>
                        <MLWeiMode>Center</MLWeiMode>
                </UserSetting>
                <OpticsInfo>
                        <LensType>Zoom</LensType>
                        <FocalLength>204/32</FocaalLength>
                        <XSizeCCD>252/1024</XSizeCCD>
                        <YSizeCCD>189/1024</YSizeCCD>
                </OpticsInfo>
                <FlashInfo>
                        <DayLightValue>94</DayLightValue>
                        <FlashLightValue>71</FlashLightValue>
                        <FlashKind>380EX</FlashKind>
                        <FlashTime>1000</FlashTime>
                </FlashInfo>
                <OwnerName>
                        <![CDATA[NULL]]>
                </OwnerName>
        </CANON>
</MakerNote>
```

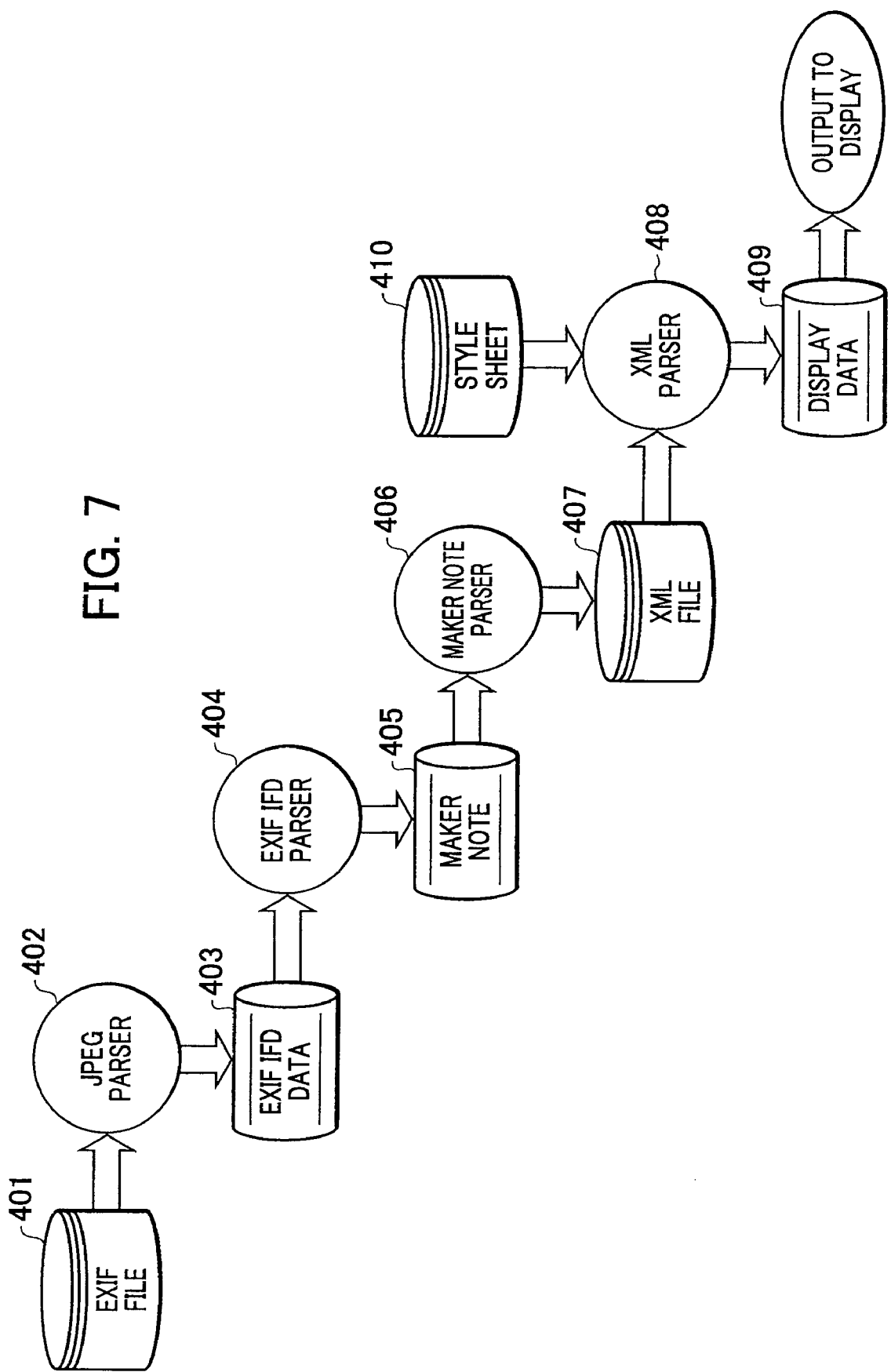

IMAGE PROCESSING APPARATUS AND METHOD FOR DESCRIBING RECORDED ATTRIBUTE INFORMATION USING TAGS, AND PROGRAM FOR IMPLEMENTING THE METHOD

BACKGROUND OF THE INVENTION

1. Field of the Invention

The present invention relates to a technique of recording and playing back a digital image using a digital device having a capability of treating a digital image, such as a digital camera, a scanner, a printer, or a PC (personal computer).

2. Description of the Related Art

The Exif (Exchangeable Image Fie Format) is widely used as a format for use by an image recording apparatus such as a digital camera to record a digital image file. In the Exif format, a main image, a sub image (in the form of a thumbnail image), and image attribute information such as picture-taking information are recorded in a predetermined form.

FIG. 2 shows a data structure of a file in the Exif format. As shown in FIG. 2, image attribute information is described in a directory named IFD in a tree directory structure. In the Exif format, it is allowed for a digital camera maker to describe its own IFD information between MakerNote tags in an Exif IFD area.

For example, Japanese Patent Laid-Open No. 2000-261756 discloses a technique of writing compressed sub image data in a file using MakerNote tags.

It is also known in the art to describe information (print commands), necessary to achieve color matching among devices, using MakerNote tags, thereby making it possible to print a high-quality image. By using print commands, it is possible to make various settings in terms of, for example, "brightness in printing", "color space", "contrast", "color saturation", "sharpness", and "memory color".

As described above, MakerNote tags can be used to describe various kinds of information in a specific area in a file so that the information makes the file more valuable in transferring, evaluating, playing back, and/or printing the image.

Because any maker is allowed to freely describe image attribute information using MakerNote tags in accordance with the definition made by the maker, there is a possibility that different types of image attribute information are described depending on the functions and/or performance of digital cameras, even for digital cameras produced by the same maker. For example, even for digital cameras produced by the same maker, the functions and the performance are improved from one generation to next, and the number of types of image attribute information is increased with increasing improvement in the functions and performance. This results in a great increase in the data size of image attribute information.

In order to support playback of image files produced using old-generation digital cameras, it is required to analyze image attribute information which is no longer used in present-generation digital cameras. This causes an increase in the program size of firmware of digital cameras and related devices.

In particular, supporting of attribute information which is used only in particular limited models of digital cameras causes other models of digital cameras to have to deal with such attribute information. This causes a large load to be imposed on design.

If information associated with know-how possessed by a maker or attribute information indicating a particular characteristic of a particular model of digital camera is described together with image data, other makers can easily know what technology the maker uses. This causes a large risk that the technology is stolen by other makers, although this is convenient for users to record and reuse images.

SUMMARY OF THE INVENTION

It is an object of the present invention to solve all or at least one of the problems described above.

More specifically, it is an object of the present invention to provide an image processing apparatus, an image processing method, and a program for implementing the image processing method, having a capability of recording/playing back a digital image wherein the capability can be extended without a significant increase in load imposed on software.

To achieve the above object, the present invention provides an image processing apparatus comprising recording means for storing an image file including an image area for storing image data and also including an attribute area for storing attribute information, description means for describing the attribute information using a tag defined by a tag-definable markup language, and writing means for writing the attribute information described by the description means into an arbitrary attribute area.

The invention also provides an image processing apparatus comprising recording means for storing an image file including an image area for storing image data and also including an attribute area for storing attribute information, description means for describing the attribute information using a tag defined by a tag-definable markup language, encryption means for encrypting part or all of the attribute information described by the description means, and writing means for writing the attribute information encrypted by the encryption means into an arbitrary attribute area.

The present invention also provides an image processing apparatus comprising recording means for storing an image file including an image area for storing image data and also including an attribute area for storing attribute information, description means for describing the attribute information using a tag defined by a tag-definable markup language, compression means for compressing part or all of the attribute information described by the description means, and writing means for writing the attribute information compressed by the compression means into an arbitrary attribute area.

The present invention also provides an image processing apparatus comprising recording means for storing an image file including an image area for storing image data and also including an attribute area for storing attribute information, description means for describing the attribute information using a tag defined by a tag-definable markup language, encryption-and-compression means for encrypting and compressing part or all of the attribute information described by the description means, and writing means for writing the attribute information encrypted and compressed by the encryption-and-compression means into an arbitrary attribute area.

The present invention also provides an image processing method comprising the steps of storing an image file including an image area for storing image data and also including an attribute area for storing attribute information, describing the attribute information using a tag defined by a tag-definable markup language, and writing the attribute information described in the description step into an arbitrary attribute area.

The present invention also provides an image processing method comprising the steps of storing an image file including an image area for storing image data and also including an attribute area for storing attribute information, describing the attribute information using a tag defined by a tag-definable markup language, encrypting part or all of the attribute information described in the description step, and writing the attribute information encrypted in the encryption step into an arbitrary attribute area.

The present invention also provides an image processing method comprising the steps of storing an image file including an image area for storing image data and also including an attribute area for storing attribute information, describing the attribute information using a tag defined by a tag-definable markup language, compressing part or all of the attribute information described in the description step, and writing the attribute information compressed in the compression step into an arbitrary attribute area.

The present invention also provides an image processing method comprising the steps of storing an image file including an image area for storing image data and also including an attribute area for storing attribute information, describing the attribute information using a tag defined by a tag-definable markup language, encrypting and compressing part or all of the attribute information described in the description step, and writing the attribute information encrypted and compressed in the encryption-and-compression step into an arbitrary attribute area.

The present invention also provides a program for causing a computer to execute a procedure comprising the steps of storing an image file including an image area for storing image data and also including an attribute area for storing attribute information, describing the attribute information using a tag defined by a tag-definable markup language, and writing the attribute information described in the description step into an arbitrary attribute area.

The present invention also provides a program for causing a computer to execute a procedure comprising the steps of storing an image file including an image area for storing image data and also including an attribute area for storing attribute information, describing the attribute information using a tag defined by a tag-definable markup language, encrypting part or all of the attribute information described in the description step, and writing the attribute information encrypted in the encryption step into an arbitrary attribute area.

The present invention also provides a program for causing a computer to execute a procedure comprising the steps of storing an image file including an image area for storing image data and also including an attribute area for storing attribute information, describing the attribute information using a tag defined by a tag-definable markup language, compressing part or all of the attribute information described in the description step, and writing the attribute information compressed in the compression step into an arbitrary attribute area.

The present invention also provides a program for causing a computer to execute a procedure comprising the steps of storing an image file including an image area for storing image data and also including an attribute area for storing attribute information, describing the attribute information using a tag defined by a tag-definable markup language, encrypting and compressing part or all of the attribute information described in the description step, and writing the attribute information encrypted and compressed in the encryption-and-compression step into an arbitrary attribute area.

The present invention also provides an image processing apparatus comprising reading means for reading, from recording means, an image file including an image area for storing image data and also including an attribute area for storing attribute information, separation means for separating image data and attribute information included in the stored image file, and extraction means for extracting attribute information by analyzing the attribute information separated by the separation means in accordance a predetermined display style.

The present invention also provides an image processing method comprising the steps of reading, from recording means, an image file including an image area for storing image data and also including an attribute area for storing attribute information, separating image data and attribute information included in the stored image file, and extracting attribute information by analyzing the attribute information separated in the separation step in accordance a predetermined display style.

The present invention also provides a program for causing a computer to execute a procedure comprising the steps of reading, from recording means, an image file including an image area for storing image data and also including an attribute area for storing attribute information, separating image data and attribute information included in the stored image file, and extracting attribute information by analyzing the attribute information separated in the separation step in accordance a predetermined display style.

Further objects, features and advantages of the present invention will become apparent from the following description of the preferred embodiments with reference to the attached drawings.

BRIEF DESCRIPTION OF THE DRAWINGS

FIG. 2 is a diagram showing an internal structure of a Exif file.

FIG. 3 is a table indicating the meanings of marker segment symbols shown in FIG. 2.

FIG. 6 is a diagram showing an example of a XML file in which attribute information of an image file is described.

FIG. 7 is a diagram showing a manner in which attribute information is processed when an image file is played back according to the first embodiment.

DESCRIPTION OF THE PREFERRED EMBODIMENTS

The present invention is described in further detail below with reference to preferred embodiments in conjunction with the accompanying drawings.

First Embodiment

Figure 1:
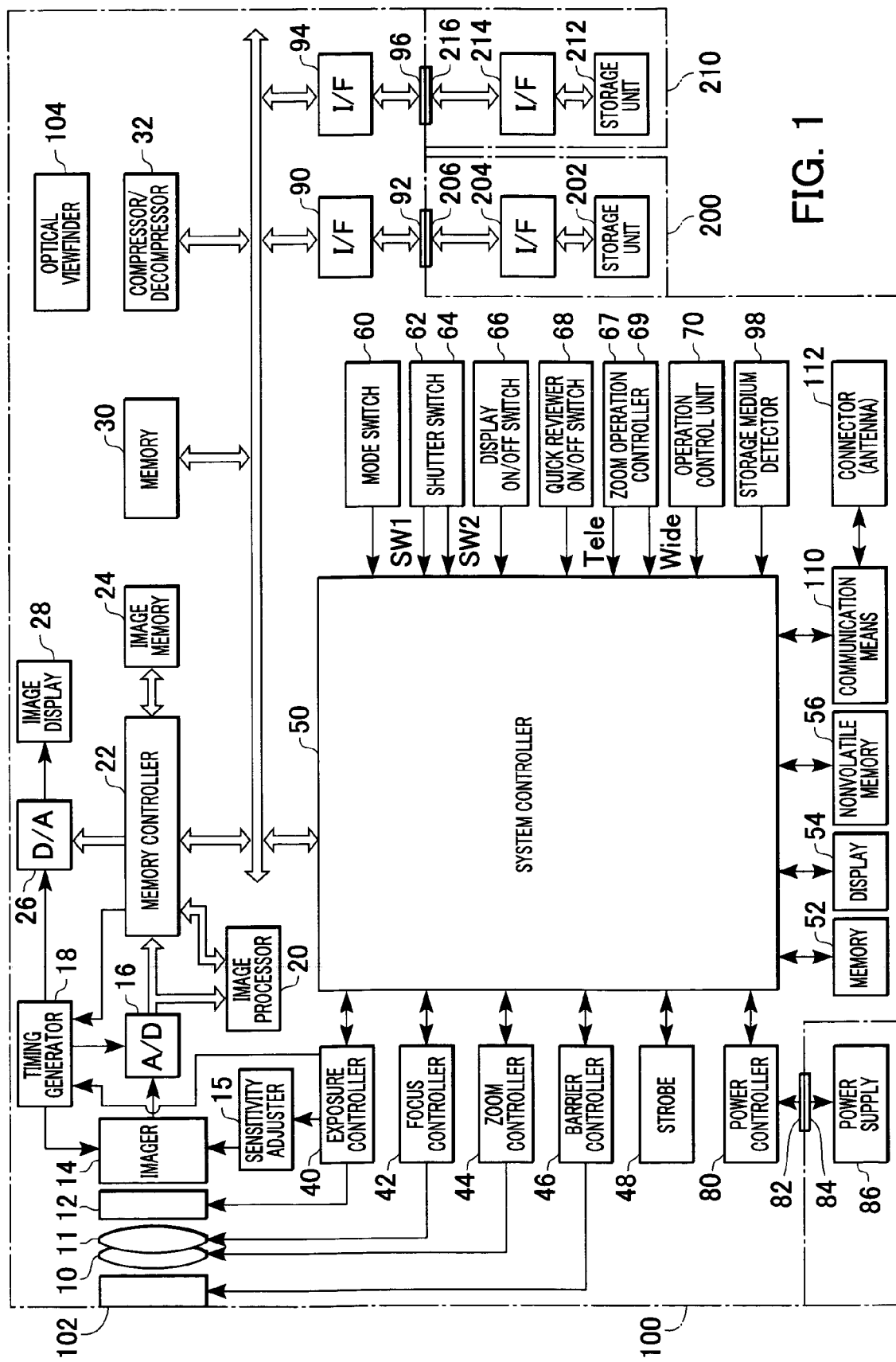
FIG. 1 is a block diagram showing an image processing apparatus according to a first embodiment of the present invention.

FIG. 1 shows a construction of an image processing apparatus 100 according to a first embodiment of the present invention.

As shown in FIG. 1, the image processing apparatus 100 includes a zoom lens system 10, a focus lens system 11, a shutter 12 having a capability of also acting as an aperture, an imager device 14 for converting an optical image into an electric signal, and sensitivity adjuster 15 for adjusting the sensitivity of the imager device 14.

A A/D converter 16 converts an analog signal output from the imager device 14 into a digital signal.

A timing generator 18 supplies a clock signal or a control signal to the imager device 14, the A/D converter 16, and a D/A converter 26, under the control of a memory controller 22 and a system controller 50.

The zoom ratio of the zoom lens system 10 can be set to one of nine values defined within the range from a wide-angle end to a close-up end, inclusive.

An image processor 20 performs image processing such as pixel interpolation and/or color conversion on data output from the A/D converter 16 or the memory controller 22. The image processor 20 performs a particular calculation for given image data. In accordance with the result of the calculation, the system controller 50 automatically adjusts focus, exposure, and lighting based on the TTL (through-the-lens) technique, by controlling the automatic exposure controller 40 and the focus controller 42. The image processor 20 further performs a particular calculation for the given image data to automatically adjust white balance using the TTL technique.

The memory controller 22 controls the A/D converter 16, the timing generator 18, the image processor 20, an image memory 24, the D/A converter 26, the memory 30, and a compression/decompression circuit 32.

The data output from the A/D converter 16 is written via the image processor 20 or directly into the image memory 24 or the memory 30 under the control of the memory controller 22.

The image data written in the image memory 24 is supplied to the display unit 28 such as a TFTLCD (Thin Film Liquid Crystal Display) via the D/A converter 26. The display unit 28 displays an image in accordance with the received data. An electronic viewfinder is realized by continuously taking an image and displaying image data thereof on the display unit 28. The display unit 28 is turned on/off in accordance with a command issued by the system controller 50. If the display unit 28 is turned off, the power consumption of the image processing apparatus 100 is greatly reduced.

The memory 30 is used to store data of a taken still image or a moving image. The memory 30 has a storage capacity high enough to store a predetermined number of still images or a moving image with a predetermined length of time. The high storage capacity of the memory 30 makes it possible to realize a continuous shooting mode in which a large number of still images are successively taken and stored in the memory 30 and also a panorama mode in which a large number of still images are also taken. The memory 30 may also be used as a work area for the system controller 50.

The compression/decompression circuit 32 compressed and decompressed image data by means of adaptive discrete cosine transformation (ADCT) or a similar technique. The compression/decompression circuit 32 reads image data from the memory 30 and compresses or decompressed the image data. The resultant data is rewritten into the memory 30.

The automatic exposure controller 40 can also serve as a flash light controller by controlling the flash lamp 48 in conjunction with the sensitivity adjuster 15, the shutter 12 having the capability of also acting as an aperture, and an electronic shutter controller for controlling the storage time from the end of sweeping out of the charge in the imager device 14 and to the start of reading image data.

The focus controller 42 controls the focus of the focus lens 11. The zoom controller 44 controls the zoom ratio of the zoom lens 10. The barrier controller 46 controls the operation of a barrier serving as protection means 102.

The flash lamp 48 has the capability of emitting auxiliary light in the auto focus adjustment and providing effect light.

The exposure controller 40 and the focus controller 42 are controlled in the through-the-lens manner by the system controller 50 in accordance with the result of the calculation performed on a taken image by the image processor 20.

The system controller 50 controls the entire image processing apparatus 100. Constants, variables, and programs used by the system controller 50 are stored in a memory 52. A display unit 54 displays information indicating the operating status or other messages using characters, images, and/or voice, in accordance with a program executed by the control of the system controller. The display unit 54 includes a LCD (liquid crystal display), a LED (Light Emitting Diode), and a sound generator such as a speaker. The display unit 54 is disposed on the image processing apparatus 100 at a position near the operation control unit such that a user can easily view the display unit 54. Two or more image processing apparatuses 100 may be disposed, as required. Some functions of the display unit 54 are available on the optical viewfinder 104.

Of various items displayed on the display unit 54, the following are displayed on the LCD: indication of single/successive-shot mode; indication of long-exposure mode; indication of night scene mode; indication of self-timer mode; indication of compression ratio; indication of resolution expressed in the number of pixels; indication of the number of taken pictures; indication of the number of pictures allowed to be further taken; indication of shutter speed; indication of f-number; indication of exposure correction; indication associated strobe; indication of red-eye correction mode (a red-eye mode lamp is lit); indication of elapsed time (since last shooting); indication of macro mode; indication of beeper setting; indication of remaining capacity of clock battery; indication of remaining battery capacity; indication of error; indication of information using a plurality of digits; indication of whether storage medium 200 or 210 is mounted; indication of the operation status of communication interface; and indication of date/time. Of items displayed on the display unit 54, the followings are displayed on the optical viewfinder 104: indication associated with focus; alarm of camera shake; indication of status of flash charging; indication of shutter speed; indication of f-number; and indication of exposure correction.

The memory 56 is of nonvolatile type capable of electrically erasing and writing data. For example, a EEPROM (Electrically Erasable and Programmable ROM) is used as the nonvolatile memory 56.

Operation control means 60, 62, 64, 66, 68, and 70 are used to input commands to the system controller 50 to specify operation conditions or modes. They are constructed in the form of a switch, a dial, a touch panel, a view-direction-sensitive pointing device, a voice recognition device, or a combination thereof. Each operation control means 60 is described below.

The operation control means 60 is in the form of a mode dial switch and is used to selectively specify one of the followings functions/modes: power-off; automatic mode; picture-taking mode; panorama mode; playback mode; multi-screen playback/erase mode; and PC-connected mode.

The operation control means 62 is a shutter switch SW1. If a shutter button (not shown) is pressed down to a half-position, the shutter switch SW1 is turned on. In response, the automatic focus control, the automatic exposure control, and the light control are started.

The operation control means 64 is a shutter switch SW2 which is turned on when the shutter button (not shown) is fully pressed down. If the shutter switch SW2 is turned on, a sequential process, including the following steps, is started: an exposure step of reading a signal from the imager device 12 and writing the signal as image data into the memory 30 via the A/D converter 16 and the memory controller 22; a developing step by performing a calculation using the image processor 20 and the memory controller 22; and a recording step of reading the image data from the memory 30, compressing the image data using the compression/decompression circuit 32, and writing the resultant image data into the storage medium 200 or 210.

The operation control means 66 is an image display on/off switch for turning on/off the display unit 28. If this switch is turned off thereby turning off the power to the display unit 28 formed of a TFTLCD or the like, and if a picture is taken using the optical viewfinder 104 without using the display unit 28, the power consumption is reduced.

The operation control means 70 is an operation control unit including a touch panel and operation control buttons such as a menu button, a set button, a macro/non-macro switch button, a next/previous page button in the multiscreen playback mode, a flash setting button, a switching button for selecting a single shot mode, a snapshot mode, a self-timer mode, a slow shutter mode, or a night scene mode, a move menu forward button, a move menu reverse button, a playback next image button, a playback previous image button, a picture quality selection button, an exposure correction button, and a date/time setting button.

A power controller 80 includes a battery detector, a DC-DC converter, and a switch for selecting a block to which to supply power. The power controller 80 detects whether a battery is mounted. If the battery is mounted, the power controller 80 detects the type of the battery and the remaining battery capacity. Depending on the detection result and under the control of the system controller 50, the power controller 80 controls the DC-DC converter to supply a necessary voltage to various parts including the storage medium for a necessary period time. In FIG. 1, reference numerals 82 and 84 denote connectors. Reference numeral 86 denotes a power supply such as a primary battery (for example, an alkaline battery or a lithium-ion battery), a secondary battery (for example, a Ni—Cd battery, a Ni-MH battery, or a Li battery), or a AC adapter.

Interfaces 90 and 94 serve to interface with a storage medium such as a memory card or a hard disk. Connectors 92 and 96 are used for making a connection with a storage medium such as a memory card or a hard disk. A storage medium detector 98 detects whether a storage medium 200 or 210 is connected to the connector 92 or 96. In the present embodiment, there are provided two interfaces and two connectors so that two storage media can be connected. The number of interfaces and the number of connectors for connection with storage media are not limited to two, but there may be provided one, three, or a greater number of interfaces and connectors. When there are provided two or more combinations of an interface and a connector, they may be different in specifications from each other so as to connect different type storage media. The interfaces and the connectors may be selected so as to connect with a PCMCIA (Personal Computer Memory Card International Association) card, a CF (Compact Flash (trademark) card, or a SD (Source Digital) card.

In the case in which the interfaces 90 and 94 and the connectors 92 and 96 are based on the PCMCIA card standard, the CF card standard, or the SD card standard, if a communication card such as a LAN (Local Area Network) card, a modem card, a USB (Universal Serial Bus) card, a IEEE1394 card, a P1284 card, a SCSI (Small Computer System Interface) card, or a PHS (Personal Handyphone System), it is possible to transmit image data and control data associated with the image data to a computer or a peripheral device such as a printer.

The protection means 102 is a barrier with which the imager unit including the zoom lens 10 and the focus lens 11 of the image processing apparatus 100 is covered so that the imager unit is protected from being damaged or made dirty.

The optical viewfinder 104 allows a picture to be taken without using the electrical viewfinder. Some of information items displayed on the display unit 54 are also displayed on the optical viewfinder 104. For example, the indication associated the focus, the indication of a camera shake alarm, the indication of the status of charge-up of the flash capacitor, the indication of the shutter speed, the indication of the f-number, the indication of the exposure correction, and the indication of the macro mode are displayed on the optical viewfinder 104.

Communication means 110 provides a communication capability via a communication medium such as RS232C, USB, IEEE1394, P1284, SCSI, a modem a LAN, or a wireless communication.

A connector 112 is used to connect the image processing apparatus 100 with another device via the communication means 110. In the case in which the communication means 110 is based on a wireless communication technique, the connector 112 is an antenna.

The storage medium 200 is a memory card or a hard disk, including a storage unit 202 such as a semiconductor memory or a magnetic disk, an interface 204 for interfacing with the image processing apparatus 100, and a connector 206 for connecting with the image processing apparatus 100.

The storage medium 210 is a memory card or a hard disk, including a storage unit 212 such as a semiconductor memory or a magnetic disk, an interface 214 for interfacing with the image processing apparatus 100, and a connector 216 for connecting with the image processing apparatus 100.

When an operation of taking a picture is completed, an image file is produced in an image file format such as a Exif format or a DCF format and stored into the storage medium 200 or 210.

If the operation is switched from the picture-taking mode into the playback mode by operating the mode dial 70, the image file stored in the storage medium 200 or 210 is read into the memory 30. Depending on the image file format, decompression is performed, if necessary, by the compression/decompression circuit 32, and necessary processing is further performed by the image processor 20. The resultant image data is stored in the image memory 24.

In accordance with attribute information of the file, the system controller 50 converts picture-taking information such as an exposure value and a picture-taking date and camera setting information such as setting in the picture-taking mode into character information indicating image attribute information. The character is then converted into font information and stored into the image memory 24. The image data written in the image memory 24 is supplied to the display unit 28 via the D/A converter 26. Thus, the image and the image attribute information are displayed on the display unit 28.

The image file format Exif (which is an image file format for use by a digital still camera, established by JEIDA) used in the present embodiment is described below.

The Exif format is based on the JPEG format (ISO/IEC10918-1) and additionally includes an application marker segment (APP1) in which to record image attribute information such as picture-taking information or a thumbnail image.

FIG. 2 shows an internal data structure of a Exif file.

In FIG. 2, the structure of the entire Exif image file is shown in an area T1-T2. As shown, this area T1-T2 includes marker segments SOI, APP1, DQT, DHT, SOF, SOS, and EOI. The Exif file includes those marker segments and compressed image data. Each of those marker segments is described in FIG. 3.

Of those markers, SOI is first written and then APP1 is written immediately after SOI. When APP2 is written, it is written following APP1. In the present embodiment, a APP2 marker is not written. DQT, DHT, DRI, and SOF are written in an arbitrary order after APP2 and before SOS.

In an area T3-T4, the details of the APP1 marker segment are shown. In accordance with the JPEG standard, the APP1 marker segment has to be described within 64 Kbytes.

In an area T10-T13, the main part of the attribute information of the APP1 marker segment is described. The attribute information is described in the TIFF (Tagged Image File Format) format including a file header. and two IFDs (0th IFD and 1st IFD). In the 0th IFD (area T11-T12), attribute information associated with a compressed image (main image) is described. In the 1st IFD (area T12-T13), a thumbnail image may be written.

The 0th IFD includes sub IFDs Exif IFD and GPS IFD. In the Exif IFD, image attribute information is written in accordance with the Exif standard. In the GPS IFD, the information associated with the location at which a picture is taken is described.

The Exif IFD (area T5-T6) includes a maker note IFD area (T20-T21) in which a maker is allowed to freely describe attribute information.

Figure 4:
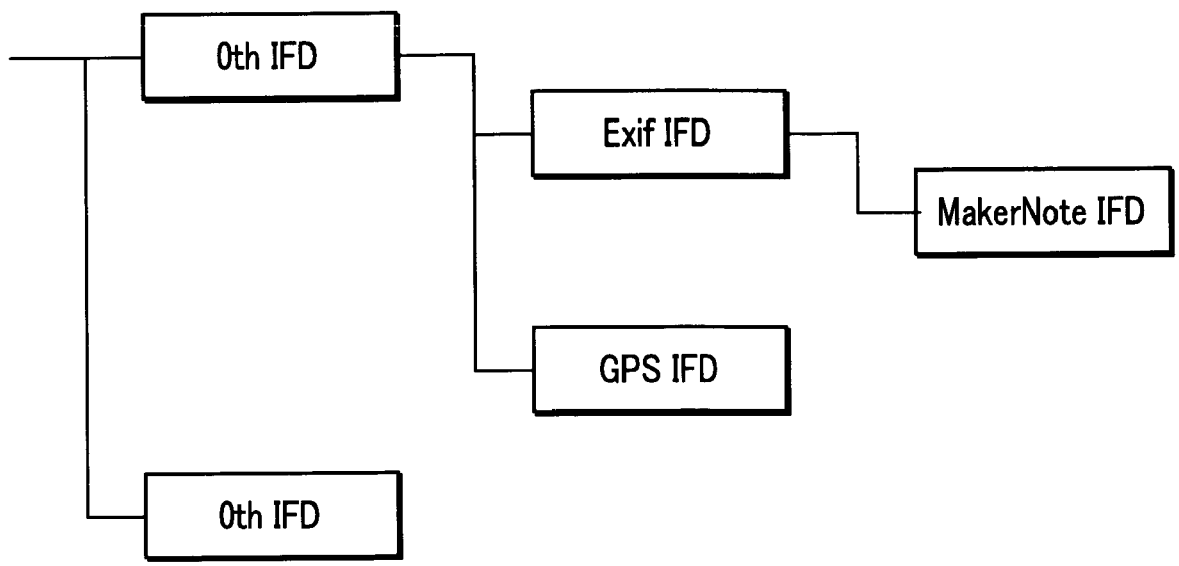
FIG. 4 is a diagram showing a hierarchical structure of a IFD.

FIG. 4 shows the hierarchical structure of the IFD.

When an image file of a taken picture is produced or when an image file is read to play back a picture, image attribute information is processed in the manner described below.

First, the manner is described in which image attribute information is processed when a picture is taken.

Figure 5:
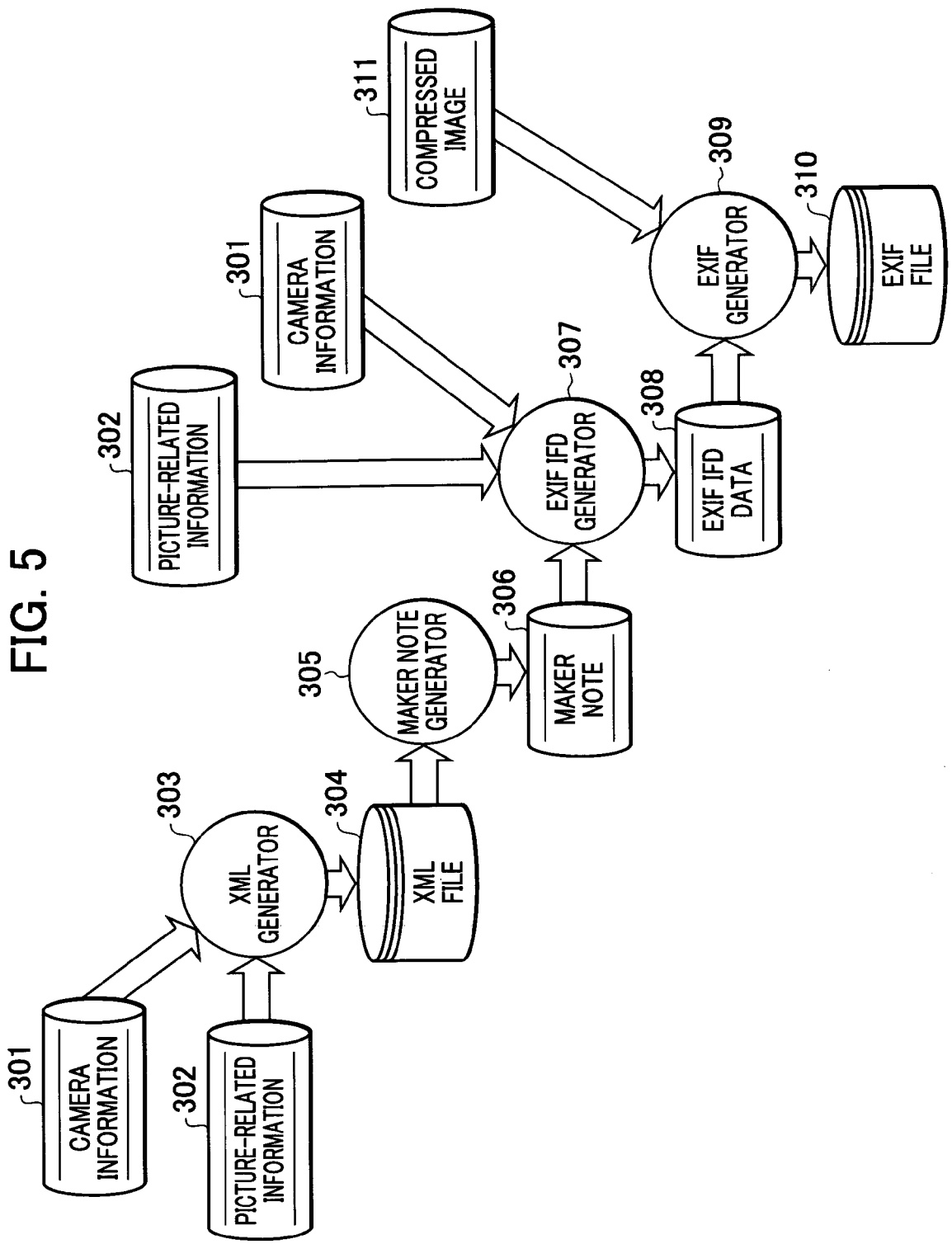
FIG. 5 is a diagram showing a manner in which attribute information is processed when an image file is produced according to the first embodiment.

FIG. 5 shows a flow of a process performed on attribute information when an image file is produced. This process is performed by the system controller 50 in accordance with a software program.

In FIG. 5, on the basis of camera information 301 and picture-taking information 302, a XML (Extensible Markup Language) generator 303 produces a XML file 304 to be written in a maker note area.

FIG. 6 shows an example of the XML file 304.

In the XML file 304, as shown in FIG. 6, each item of attribute information is described between a corresponding tag pair in accordance with the XML language format. For example, "On" is described between a tag "<Macro>" and a "</Macro>".

Although in the present embodiment, image attribute information is described using the XML language, image attribute information may be described using another tag-definable markup language.

The produced XML file 304 is stored in the memory 30 or the storage medium 200 or 210 shown in FIG. 1.

Referring again to FIG. 5, the XML file 304 is input to a maker note generator 305. On the basis of the input XML file 304, the maker note generator 305 produces maker note data 306 including maker note IFD tags.

The maker note data 306 is input together with picture-taking information 302 and camera information 301 to a Exif IFD generator 307 to produce Exif IFD data 308.

Finally, the Exif IFD data 308 and compressed image data 311 are input to a Exif generator 309 to produce a Exif file 310.

In this manner, a Exif file can be produced which includes a maker note area in which image attribute information is described in the XML language.

The manner in which image attribute information is processed in playback operation is described below.

FIG. 7 shows a manner in which attribute information is processed when an image file is played back. This process is also performed by the system controller 50 in accordance with a software program.

In FIG. 7, the Exif file 401 is separated by a Exif parser 402 into compressed image data and IFD information. In the example shown in FIG. 7, Exif IFD data 403 is extracted.

The Exif IFD data 403 is input to Exif IFD parser 404 to extract maker note data 405.

The maker note data 405 is input to the maker note parser 406 to extract a XML file 407.

The XML file 407 is input to the XML parser 408 to extract display data 409. Herein, if a style sheet 410 is also input together with the XML file 407 to the XML parser 408, the display data 409 is produced in accordance with the layout rule specified by the style sheet 410 which defines the type of attribute information to be analyzed and the display style in which to display the attribute information on the display means.

In this case, of various tags described in the XML file 407, only information associated with those tags described in the style sheet is analyzed, and the display data is produced in accordance with the result of the analysis.

The display data 409 is output to the image display device and is displayed thereon.

In this manner, the Exif file including the maker note area in which image attribute information is described in the XML language is played back and the attribute information is displayed.

Because only attribute information associated with tags specified in the style sheet is analyzed, the attribute information can be easily analyzed in a short time even when the original XML file includes a large amount of attribute information.

Second Embodiment

In this second embodiment, an image processor is similar in structure to that employed in the first embodiment, although it operates differently. That is, the image processor has a similar hardware structure to that according to the first embodiment described above with reference to FIG. 1, and thus a further detailed description thereof is not given herein.

First, the manner is described in which image attribute information is processed when a picture is taken.

Figure 8:
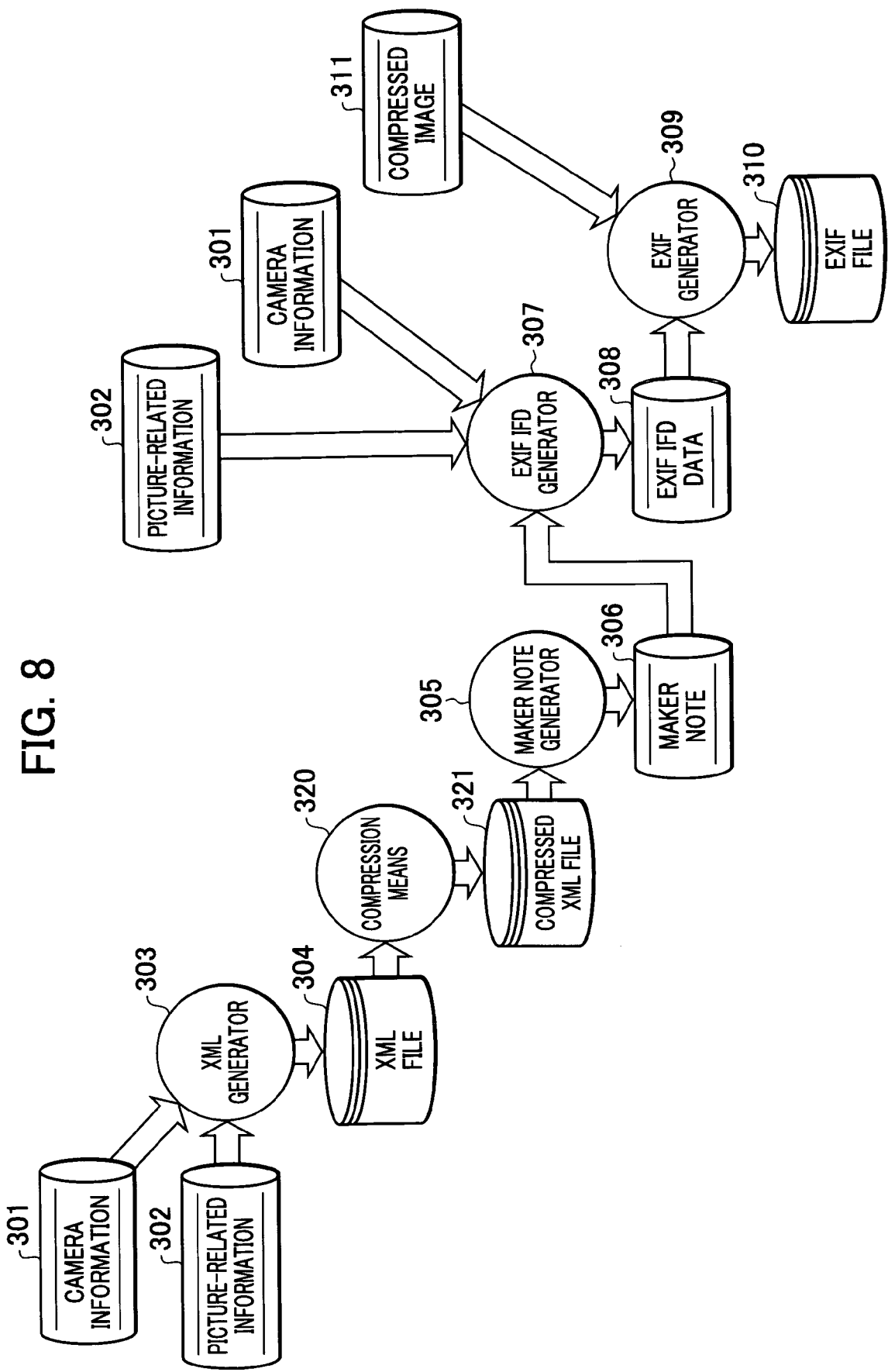
FIG. 8 is a diagram showing a manner in which attribute information is processed when an image file is produced according to a second embodiment.

FIG. 8 shows a flow of a process performed on attribute information when an image file is produced. This process is performed by the system controller 50 shown in FIG. 1 in accordance with a software program.

In FIG. 8, on the basis of camera information 301 and picture-taking information 302, a XML generator 303 produces a XML file 304 to be written in a maker note area.

The produced XML file 304 is stored in the memory 30 or the storage medium 200 or 210 shown in FIG. 1.

The XML file 304 is input to the compression means 320 to produce a compressed XML file 321. In the present embodiment, the compression means 320 is realized by means of software executed by the controller 50, although it may also be realized by means of hardware.

The compressed XML file 321 is input to a maker note generator 305. On the basis of the input compressed XML file 321, the maker note generator 305 produces maker note data 306 including maker note IFD tags.

The maker note data 306 is input together with picture-taking information 302 and cameral information 301 to a Exif IFD generator 307 to produce Exif IFD data 308.

Finally, the Exif IFD data 308 and compressed image data 311 are input to a Exif generator 309 to produce a Exif file 310.

In this manner, the Exif file is produced which includes a maker note area in which image attribute information is described in a compressed form in the XML language.

Now, the manner in which image attribute information is processed when an image file is played back is described.

Figure 9:
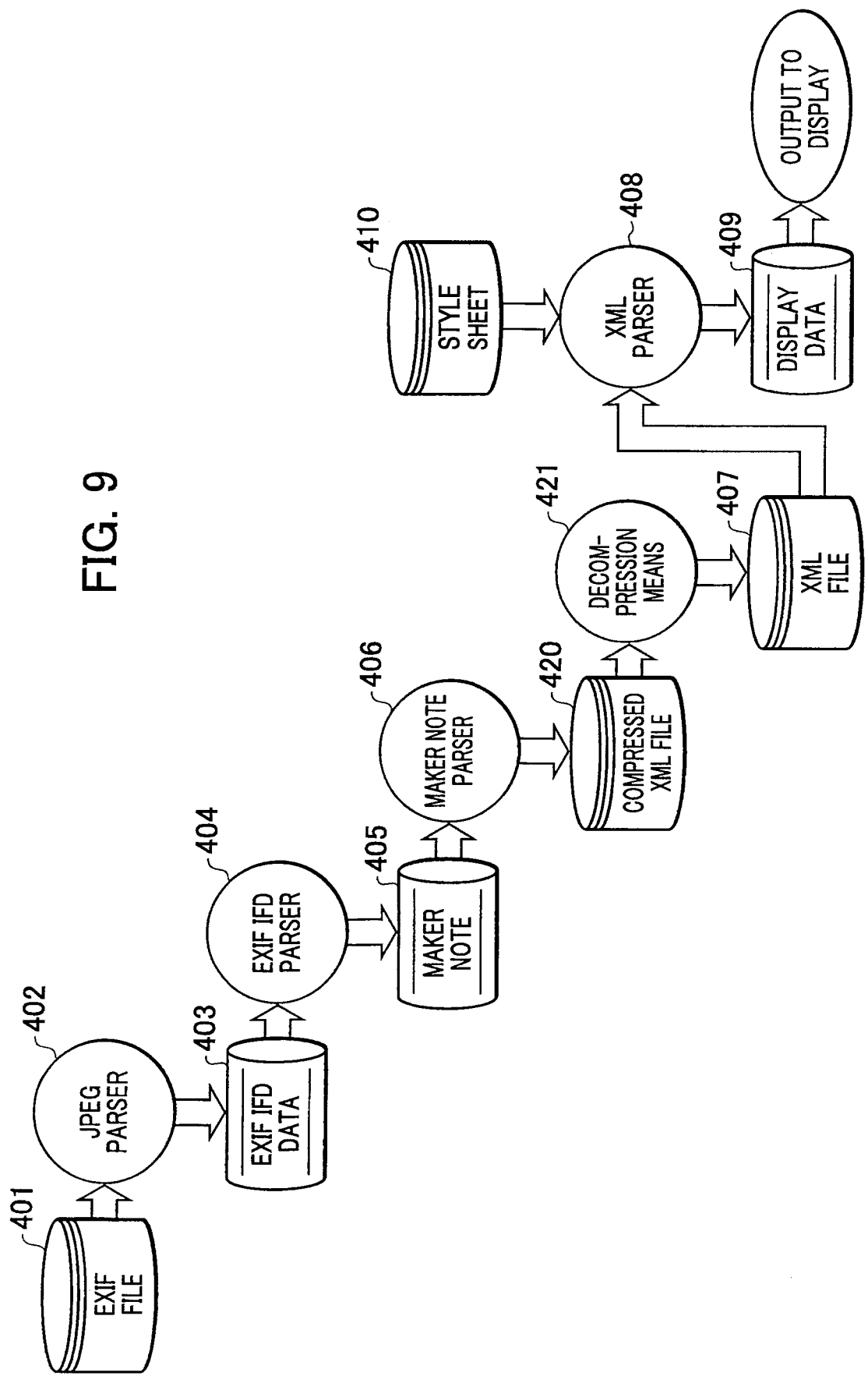
FIG. 9 is a diagram showing a manner in which attribute information is processed when an image file is played back according to the second embodiment.

FIG. 9 shows a flow of a process performed on attribute information when an image file is played back. This process is also performed by the system controller 50 in accordance with a software program.

In FIG. 9, the Exif file 401 is separated by a Exif parser 402 into compressed image data and IFD information. In the example shown in FIG. 9, Exif IFD data 403 is extracted.

The Exif IFD data 403 is input to a Exif IFD parser 404 to extract maker note data 405.

The maker note data 405 is input to a maker note parser 406 to extract compressed XML file 420.

The compressed XML file 420 is input to decompression means 421 to produce a XML file 407. The decompression means 421 serves to decompress data compressed by the compression means 320. In the present embodiment, the decompression means 421 is realized by means of software executed by the controller 50, although it may also be realized by means of hardware.

The decompressed XML file 407 is input to the XML parser 408 to extract display data 409. Herein, if a style sheet 410 is also input together with the decompressed XML file 407 to the XML parser 408, the display data 409 is produced in accordance with the layout rule specified by the style sheet 410.

The display data 409 is output to the image display device and is displayed thereon.

In this manner, the Exif file including the maker note area in which image attribute information is described in the compressed form in the XML language is decompressed and the attribute information is displayed.

Third Embodiment

In this third embodiment, an image processor is similar in structure to that employed in the first embodiment, although it operates differently. That is, the image processor has a similar hardware structure to that according to the first embodiment described above with reference to FIG. 1, and thus a further detailed description thereof is not given herein.

First, the manner is described in which image attribute information is processed when a picture is taken.

Figure 10:
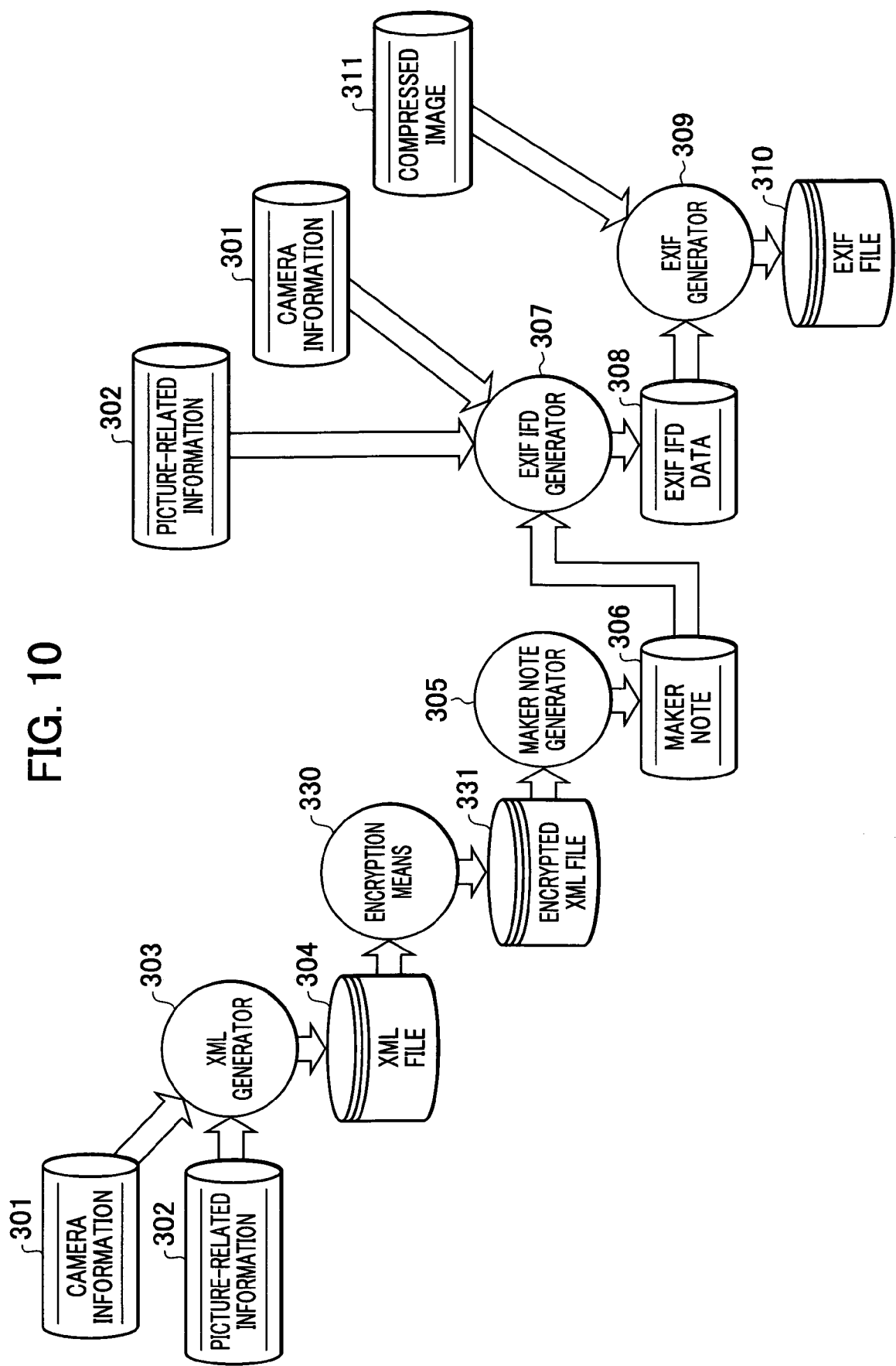
FIG. 10 is a diagram showing a manner in which attribute information is processed when an image file is produced according to a third embodiment.

FIG. 10 shows a flow of a process performed on attribute information when an image file is produced. This process is performed by the system controller 50 shown in FIG. 1 in accordance with a software program.

In FIG. 10, on the basis of camera information 301 and picture-taking information 302, a XML generator 303 produces a XML file 304 to be written in a maker note area.

The produced XML file 304 is stored in the memory 30 or the storage medium 200 or 210 shown in FIG. 1.

The XML file 304 is input to encryption means 330 to produce an encrypted XML file 331. In the present embodiment, the encryption means 330 is realized by means of software executed by the controller 50, although it may also be realized by means of hardware.

The encrypted XML file 331 is input to a maker note generator 305. On the basis of the input encrypted XML file 331, the maker note generator 305 produces maker note data 306 including maker note IFD tags.

The maker note data 306 is input together with picture-taking information 302 and cameral information 301 to a Exif IFD generator 307 to produce Exif IFD data 308.

Finally, the Exif IFD data 308 and compressed image data 311 are input to a Exif generator 309 to produce a Exif file 310.

In this manner, the Exif file including a maker note area in which image attribute information is described in an encrypted form in the XML language is produced.

Now, the manner in which image attribute information is processed when an image file is played back is described.

Figure 11:
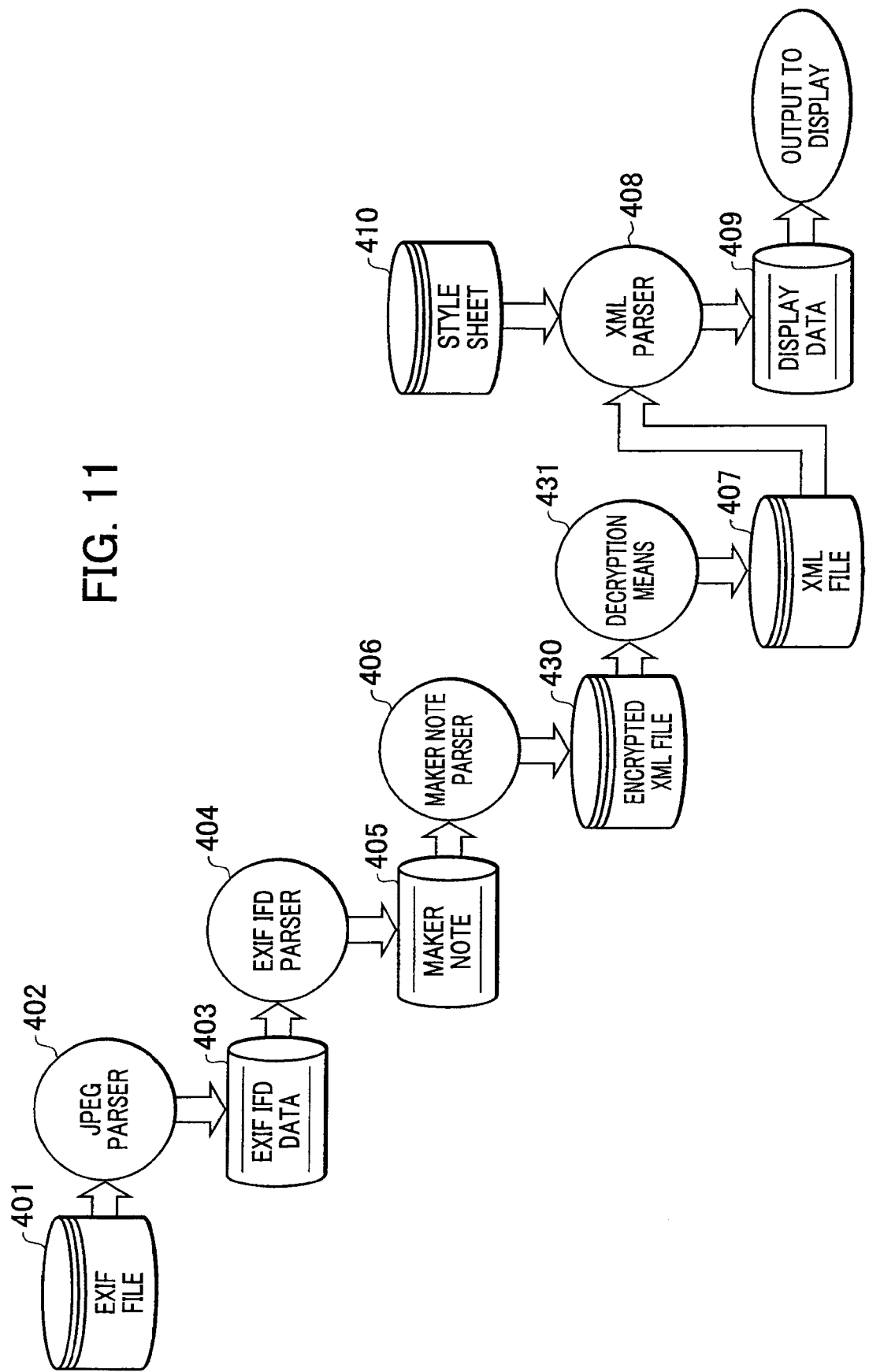
FIG. 11 is a diagram showing a manner in which attribute information is processed when an image file is played back according to the third embodiment.

FIG. 11 shows a flow of a process performed on attribute information when an image file is played back. This process is also performed by the system controller 50 in accordance with a software program.

In FIG. 11, the Exif file 401 is separated by a Exif parser 402 into compressed image data and IFD information. In the example shown in FIG. 11, Exif IFD data 403 is extracted.

The Exif IFD data 403 is input to a Exif IFD parser 404 to extract maker note data 405.

The maker note data 405 is input to a maker note parser 406 to extract an encrypted XML file 430.

The encrypted XML file 430 is input to decryption means 431 to produce a XML file 407. The decryption means 431 serves to decrypt data encrypted by the encryption means 330. In the present embodiment, the decryption means 431 is realized by means of software executed by the controller 50, although it may also be realized by means of hardware.

The decrypted XML file 407 is input to the XML parser 408 to extract display data 409. Herein, if a style sheet 410 is also input together with the decrypted XML file 407 to the XML parser 408, the display data 409 is produced in accordance with the layout rule specified by the style sheet 410.

The display data 409 is output to the image display device and is displayed thereon.

In this manner, the Exif file including the maker note area in which image attribute information is described in the encrypted form in the XML language is decrypted and the attribute information is displayed.

Fourth Embodiment

In this fourth embodiment, an image processor is similar in structure to that employed in the first embodiment, although it operates differently. That is, the image processor has a similar hardware structure to that according to the first embodiment described above with reference to FIG. 1, and thus a further detailed description thereof is not given herein.

First, the manner in which image attribute information is processed when a picture is taken is described.

Figure 12:
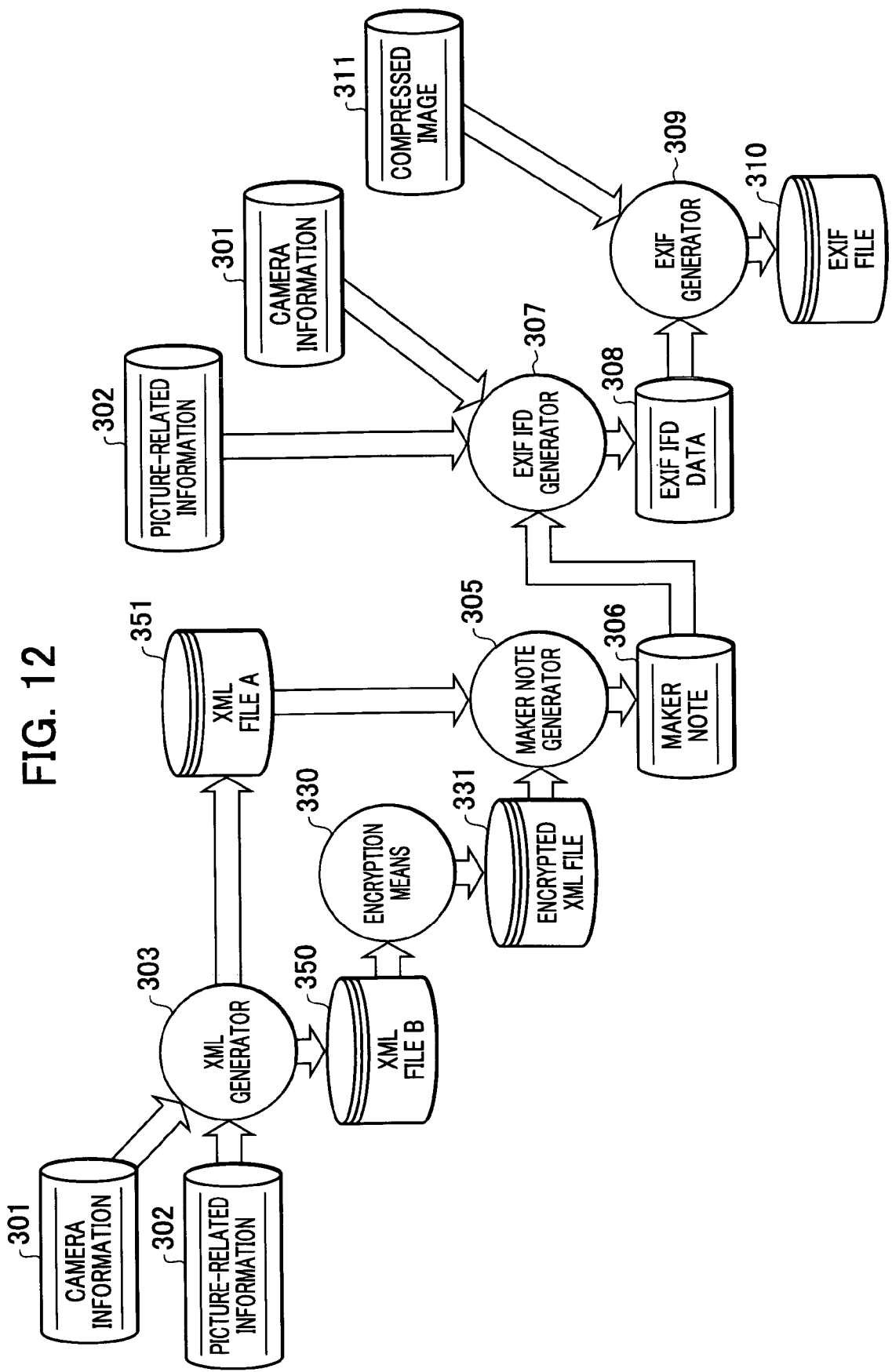
FIG. 12 is a diagram showing a manner in which attribute information is processed when an image file is produced according to a fourth embodiment.

FIG. 12 shows a flow of a process performed on attribute information when an image file is produced. This process is performed by the system controller 50 shown in FIG. 1 in accordance with a software program.

In FIG. 12, on the basis of camera information 301 and picture-taking information 302, a XML generator 303 produces a XML file A 351 and a XML file B 350 to be written in a maker note area. In the XML file A 351, information which is useful for users is described. For example, picture-taking information such as the f-number and the shutter speed or camera setting information such as settings in the picture-taking mode is described in the XML file A 351. On other hand, in the XML file B 350, information which is not needed to be informed to users is described. For example, information associated with adjustments made at factories is described herein.

The XML file B350 is input to encryption means 330 to produce an encrypted XML file 331. In the present embodiment, the encryption means 330 is realized by means of software executed by the controller 50, although it may also be realized by means of hardware.

The encrypted XML file 331 and the non-encrypted XML file 351 are input to a maker note generator 305. On the basis of the input files 331 and 351, the maker note generator 305 produces maker note data 306 including maker note IFD tags.

The maker note data 306 is input together with picture-taking information 302 and camera information 301 to a Exif IFD generator 307 to produce Exif IFD data 308.

Finally, the Exif IFD data 308 and compressed image data 311 are input to a Exif generator 309 to produce a Exif file 310.

Thus, the Exif file is produced which includes the maker note area in which image attribute information described in the encrypted form in the XML language and image attribute information described in the non-encrypted form in the XML language are written.

Now, the manner in which image attribute information is processed when an image file is played back is described.

Figure 13:
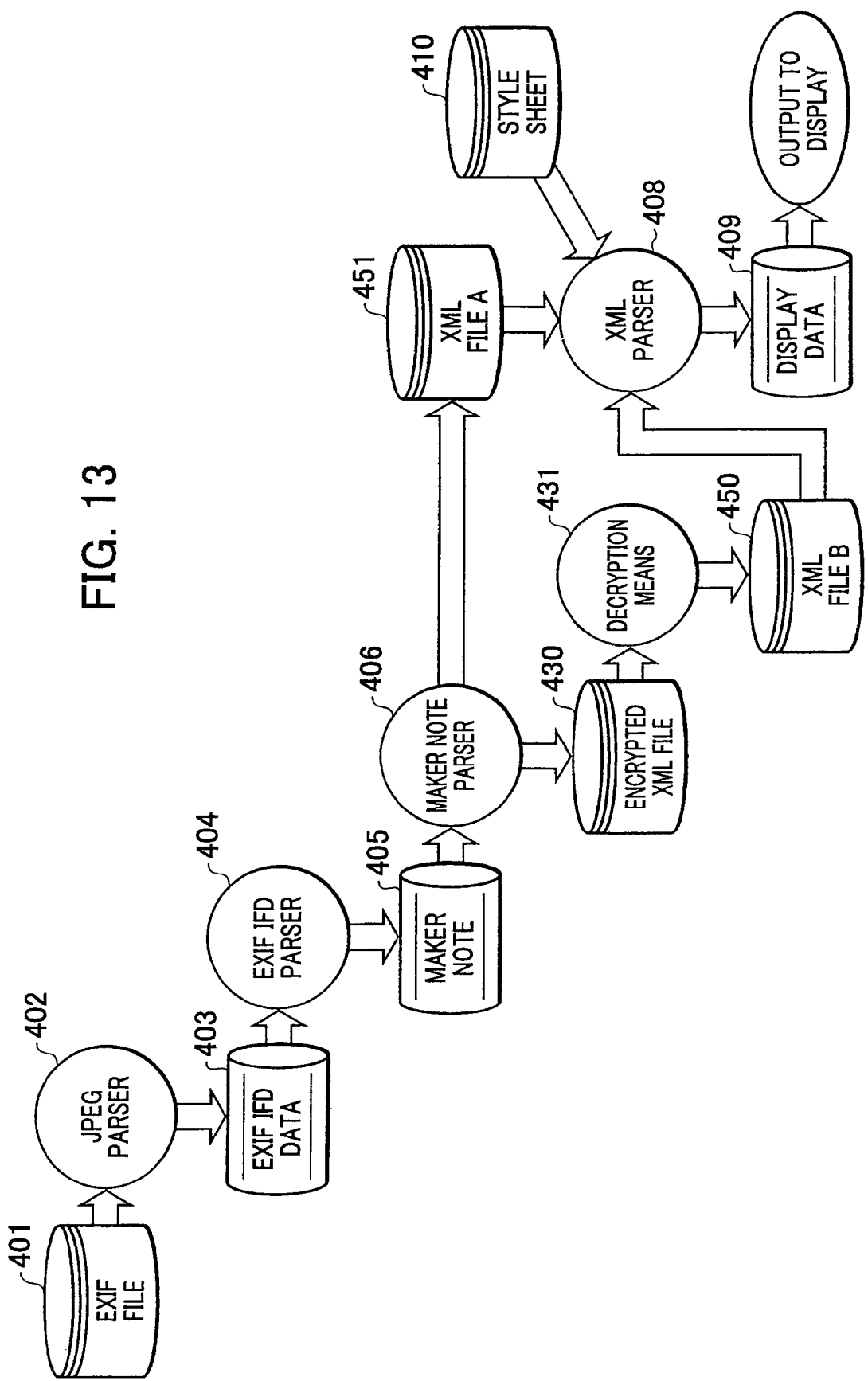
FIG. 13 is a diagram showing a manner in which attribute information is processed when an image file is played back according to the fourth embodiment.

FIG. 13 shows a flow of a process performed on attribute information when an image file is played back. This process is also performed by the system controller 50 in accordance with a software program.

In FIG. 13, the Exif file 401 is separated by a Exif parser 402 into compressed image data and IFD information. In the example shown in FIG. 13, Exif IFD data 403 is extracted.

The Exif IFD data 403 is input to a Exif IFD parser 404 to extract maker note data 405.

The maker note data 405 is input to a maker note parser 406 to extract a XML file A 451 and an encrypted XML file 430.

The encrypted XML file 430 is input to decryption means 431 to produce a XML file B 450. The decryption means 431 serves to decrypt data encrypted by the encryption means 330. In the present embodiment, the decryption means 431 is realized by means of software executed by the controller 50, although it may also be realized by means of hardware.

The encrypted XML file and/or the XML file A may be compressed as in a previous embodiment, and they may be decompressed when an image is played back. This is desirable in that the data size can be reduced.

The XML file A 451 and the decrypted XML file B 450 are input to the XML parser 408 to extract display data 409.

Herein, if a style sheet 410 is also input together with the XML file A 451 and the decrypted XML file B 450 to the XML parser 408, the display data 409 is produced in accordance with the layout rule specified by the style sheet 410.

In this process, of various tags described in the XML file 407, only those tags specified in the style sheet are analyzed, and display data is produced in accordance with the result of the analysis.

The display data 409 is output to the image display device and is displayed thereon.

In the above process, only one of the XML file A 451 and the XML file B 450 may be selectively input to the XML parser 408. For example, when the XML file B450 includes no information necessary in displaying an image, it is desirable to input only the XML file A 451 to the XML parser 408.

Thus, the Exif file including the maker note area in which image attribute information described in the encrypted form in the XML language and image attribute information described in the non-encrypted form in the XML language are written is decrypted and the image attribute information is displayed.

In the above process, the XML parser 408 may analyze only the non-encrypted XML file A without analyzing the encrypted XML file.

This can be accomplished by executing a preinstalled program or by employing a style sheet which does not include an encrypted part.

As a matter of course, the style sheet may also include attribute information included in the encrypted XML file.

The encrypted XML file may advantageously used to describe secret information such as attribute information associated with a special model of digital camera, information associated with know-how a maker has, or attribute information indicating a particular characteristic of a particular model of digital camera, without causing the secret information to be easily read by other makers.

It is more desirable that key information necessary to decrypt the encrypted XML file be described in the style sheet.

This makes it possible to analyze attribute information only when the style sheet including the key information is used. In this case, only attribute information specified by the style sheet can be displayed, and thus special attribute information that the maker wants to keep secret can be protected.

It is also desirable that a plurality of different encryptions be applied to the XML file so that analyzable attribute information can be switched by selecting an encryption.

In this case, only particular attribute information corresponding to a decryption key described in the style sheet can be decrypted, thereby making it possible to protect, in a more reliable manner, the attribute information that the maker wants to keep secret.

In FIGS. 5 to 13, the XML generator 303, the maker note generator 305, the Exif IFD generator 307, the Exif generator 309, the Exif parser 402, the Exif IFD parser 404, the maker note parser 406, the XML parser 408, the style sheet 410, the compression means 320, the encryption means 330, the decompression means 421, and the decryption means 431 are realized by means of software executed by the system controller 50. Those components can be realized as software components independently of each other.

If those software components are installed not only in a digital cameral but also in another device such as a printer, a facsimile machine, a scanner, or a personal computer, then it becomes possible for various different devices to treat image attribute information.

If the communications means 110, the interfaces 90 and 94 and the connectors 92 and 96 are formed according to the standard for PCMICA cards, CD cards, or SD cards, then it is possible to transfer software components described above by means of downloading via a communication card such as a LAN card, a modem card, a USB card, a IEEE1394 card, a P1284 card, a SCSI card, or a PHS, connected to the connector 92 or 96. In this case, the downloaded software components are installed in the memory 30 or 52 or the storage medium 200 or 210. This makes it possible to replace an existing software component with a new software component, depending on the item of image attribute information, the format of information, and/or the layout of an image displayed on the display device.

If two or more of software components are stored in the memory 30 or 52 or the storage medium 200 or 210, it becomes possible to selectively use those software components. This allows an improvement in convenience. For example, if a plurality of style sheets 511 are prepared as software components, it becomes possible for a user to select a desired one to display an image and associated image information according to the selected display layout.

In the second embodiment described above, the XML file is compressed and decompressed, while the XML file is encrypted in the third and fourth embodiments. Alternatively, both compression and encryption may be applied to the XML file. That is, the Exif file may include attribute information described in a XML file in a compressed and encrypted form.

The present invention may be applied to a system including a plurality of devices (such as a host computer, an interface device, a reader, and a printer) or may be applied to a single apparatus (such as an image display device, a printer, a copying machine, a facsimile machine).

The objects of the present invention may also be achieved by supplying a storage medium, on which a software program implementing the functions of any of the embodiments described above is stored, to a system or an apparatus whereby a computer (CPU or MPU) in the system or apparatus reads and executes the program code stored on the storage medium.

In this case, it should be understood that the program code read from the storage medium implements the functions of invention and thus the storage medium storing the program code falls within the scope of present invention.

Storage media which can be preferably employed in the present invention to supply the program code include a floppy disk, hard disk, optical disk, magneto-optical disk, CD-ROM, CD-R, magnetic tape, non-volatile memory card, and ROM. The program code may be supplied from a server computer via a communication network.

Furthermore, the scope of the present invention includes not only such a system in which the functions of any embodiment described above is implemented simply by reading and executing a program code on a computer but also a system in which a part of or the whole of process instructed by the program code is performed using a OS (operating system) on the computer.

Furthermore, the scope of the present invention also includes a system in which a program code is transferred once from a storage medium into a memory provided in a function extension board inserted in a computer or provided in a function extension unit connected to the computer, and then a part of or the whole of process instructed by the program code is performed by a CPU or the like in the function extension board or the function extension unit thereby implementing the functions of any embodiment described above.

As described above, by describing image attribute information in a tag-definable markup language and storing it in a file, it becomes possible to easily analyze the information and display it regardless of what is described in the image attribute information.

Furthermore, by realizing the generator for producing various data and the parser for analyzing the data in the form of software components, it becomes possible to transfer software components thereby easily changing the means for analysis and display.

Furthermore, it also becomes possible for various different devices to deal with image files including image attribute information described in various different formats, without causing an increase in the software size.

Furthermore, it also becomes possible to easily achieve compatibility with old image file formats.

Furthermore, the attribute information described in the XML language may be divided into an open part and a concealed part, and only information such as picture-taking information which should be provided to users may be described in the open part, while information (for example, values adjusted in factories) that makers want to keep secret may be described in the concealed part.

Furthermore, it also becomes sufficient to analyze only particular attribute information, and thus it is possible to prevent an increase in load imposed on the apparatus even when the file includes a large amount of attribute information.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   a recording apparatus comprising:
      a first input unit that inputs camera information and picture taking information;
      a first generator that generates a file from the camera information and picture taking information received from the first input unit;
      a recording device configured to store the file generated by the first generator;
      an encryption device configured to encrypt the stored camera and picture taking information;
      a maker note generator that generates encrypted maker note data including maker note tags of the encrypted camera and picture taking information;
      a second input unit that inputs the camera information and the picture taking information;
      a second generator that generates image attribute data from the camera and picture taking information input from the second input unit and the encrypted maker note data generated by the maker note generator;
      a third input unit that inputs a compressed image data;
      a third generator that generates an image file from the compressed image data received from the third input unit and the image attribute data received from the second generator that generates the image attribute data from the camera and picture taking information input from the second input unit and the encrypted maker note data generated by the maker note generator; and a storing device configured to store the image file generated by the third generator; and a playback device comprising:

a separation device configured to separate image data and the image attribute data included in the stored image file;

a first extraction device configured to extract the encrypted maker note data from the separated image attribute data;

a decryption device configured to decrypt the extracted, encrypted maker note data;

a style-sheet input device configured to input style sheet data;

a second extraction device configured to receive the input style sheet data and the decrypted maker note data and to extract display data from the decrypted maker note data to produce display data from the decrypted maker note data in accordance with a layout rule specified in the style sheet data; and a display device configured to display the display data.

2. An image processing method comprising the steps of:

a recording operation comprising the steps of:

inputting camera information and picture taking information in a first instance;

generating a file from the camera information and picture taking information received inputted in said inputting step;

storing the file generated in said generating step;

encrypting the stored camera information and picture taking information;

generating encrypted maker note data including maker note tags of the encrypted camera and picture taking information;

inputting the camera information and the picture taking information in a second instance;

generating image attribute data from the camera and picture taking information input in said second-instance inputting step and the encrypted maker note data generated by said maker note generating step;

inputting compressed image data;

generating an image file from the compressed image data input by the compressed-data inputting step and the image attribute data generated in the attribute-date generating step that generates the image attribute data from the camera and picture taking information input in said second-instance inputting step and the encrypted maker note data generated by the maker note generating step; and storing the image file generated in the image-file generating step; and a playback operation comprising the steps of:

separating image data and the image attribute data included in the stored image file;

extracting the encrypted maker note data from the separated image attribute data;

decrypting the extracted, encrypted maker note data;

inputting style sheet data;

extracting display data from the decrypted maker note data to produce display data from the decrypted maker note data in accordance with a layout rule specified in the inputted style sheet data; and displaying the display data.

3. A program, stored in a computer-readable storage medium, for causing a computer to execute a procedure comprising the steps of:

a recording operation comprising the steps of:

inputting camera information and picture taking information in a first instance;

generating a file from the camera information and picture taking information received inputted in said inputting step;

storing the file generated in said generating step;

encrypting the stored camera information and picture taking information;

generating encrypted maker note data including maker note tags of the encrypted camera and picture taking information;

inputting the camera information and the picture taking information in a second instance;

generating image attribute data from the camera and picture taking information input in said second-instance inputting step and the encrypted maker note data generated by said maker note generating step;

inputting compressed image data;

generating an image file from the compressed image data input by the compressed-data inputting step and the image attribute data generated in the attribute-date generating step that generates the image attribute data from the camera and picture taking information input in said second-instance inputting step and the encrypted maker note data generated by the maker note generating step; and storing the image file generated in the image-file generating step; and a playback operation comprising the steps of:

separating image data and the image attribute data included in the stored image file;

extracting the encrypted maker note data from the separated image attribute data;

decrypting the extracted, encrypted maker note data;

inputting style sheet data;

extracting display data from the decrypted maker note data to produce display data from the decrypted maker note data in accordance with a layout rule specified in the inputted style sheet data; and displaying the display data.

* * * * *